United States Patent
Dittmar

(10) Patent No.: US 11,592,109 B2
(45) Date of Patent: Feb. 28, 2023

(54) BEARING SEAL

(71) Applicant: AKTIEBOLAGET SKF, Gothenburg (SE)

(72) Inventor: Rico Dittmar, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 385 days.

(21) Appl. No.: 16/684,699

(22) Filed: Nov. 15, 2019

(65) Prior Publication Data

US 2020/0166081 A1    May 28, 2020

(30) Foreign Application Priority Data

Nov. 27, 2018 (DE) .......................... 102018220346.6

(51) Int. Cl.
| | |
|---|---|
| *F16J 15/3256* | (2016.01) |
| *F16C 33/78* | (2006.01) |
| *F16J 15/3264* | (2016.01) |
| *F16C 33/80* | (2006.01) |

(52) U.S. Cl.
CPC ....... *F16J 15/3256* (2013.01); *F16C 33/7883* (2013.01); *F16C 33/7889* (2013.01); *F16C 33/805* (2013.01); *F16J 15/3264* (2013.01)

(58) Field of Classification Search
CPC .. F16J 15/3212; F16J 15/3256; F16J 15/3264; F16C 33/7883; F16C 33/7886; F16C 33/7889; F16C 33/805
See application file for complete search history.

(56) References Cited

U.S. PATENT DOCUMENTS

| | | | | |
|---|---|---|---|---|
| 3,022,081 A | * | 2/1962 | Kosatka | F16J 15/3256 277/402 |
| 3,086,781 A | * | 4/1963 | Hudson | F16J 15/3256 277/568 |
| 3,762,726 A | * | 10/1973 | Jornhagen | F16J 15/3256 277/575 |
| 4,208,057 A | * | 6/1980 | Messenger | F16J 15/3264 277/568 |
| 4,285,526 A | * | 8/1981 | Klinteberg | F16J 15/3256 277/575 |
| 4,327,922 A | * | 5/1982 | Walther | F16J 15/3256 277/351 |

(Continued)

FOREIGN PATENT DOCUMENTS

| | | |
|---|---|---|
| CH | 217574 A | 10/1941 |
| CN | 1900544 A | 1/2007 |

(Continued)

OTHER PUBLICATIONS

First Office Action from related application CN 201911139214.6 dispatched Oct. 11, 2022, and English translation thereof.

*Primary Examiner* — Nicholas L Foster
(74) *Attorney, Agent, or Firm* — J-Tek Law PLLC; Scott T. Wakeman; Mark A. Ussai

(57) ABSTRACT

A bearing seal includes at least one first metal-plate element having an attachment region for attaching the first metal-plate element to a bearing inner ring, at least one seal element attached to the first metal-plate element, and at least one spring element configured to press at least one region of the seal element in a radially outward direction. Also a wheel bearing assembly including the bearing seal.

10 Claims, 2 Drawing Sheets

(56) References Cited

U.S. PATENT DOCUMENTS

| | | | | |
|---|---|---|---|---|
| 4,432,557 | A * | 2/1984 | Drucktenhengst | F16J 15/3256 277/560 |
| 4,592,666 | A * | 6/1986 | Jornhagen | F16C 19/386 384/477 |
| 4,790,543 | A * | 12/1988 | Wittmeyer | F16J 15/3204 277/433 |
| 5,004,248 | A * | 4/1991 | Messenger | F16J 15/3256 277/423 |
| 5,082,294 | A * | 1/1992 | Toth | F16J 15/3256 277/930 |
| 5,135,236 | A * | 8/1992 | Kruk | F16C 33/7813 277/572 |
| 5,944,321 | A * | 8/1999 | Niebling | F16C 33/7889 277/566 |
| 6,273,428 | B1 * | 8/2001 | Sassi | F16J 15/3256 277/374 |
| 6,450,503 | B1 * | 9/2002 | Dossena | F16J 15/3256 277/572 |
| 6,471,211 | B1 * | 10/2002 | Garnett | F16J 15/3256 277/572 |
| 7,018,105 | B2 * | 3/2006 | Oka | F16C 33/7813 384/448 |
| 7,131,648 | B2 * | 11/2006 | Peterson, Jr. | F16C 33/78 277/553 |
| 7,658,386 | B2 * | 2/2010 | Oldenburg | F16J 15/3256 277/572 |
| 7,926,814 | B2 * | 4/2011 | Foti | D06F 37/00 277/572 |
| 8,734,022 | B2 * | 5/2014 | Dittmar | F16J 15/3276 384/480 |
| 8,820,751 | B2 * | 9/2014 | Denton | F16J 15/3252 277/576 |
| 9,464,720 | B2 * | 10/2016 | Brunetti | F16C 33/7869 |
| 9,751,576 | B2 * | 9/2017 | Suzuki | F16J 15/3256 |
| 10,794,491 | B2 * | 10/2020 | Jimenez | F16J 15/3268 |
| 11,015,655 | B2 * | 5/2021 | Shah | F16C 33/7823 |
| 2002/0011710 | A1 * | 1/2002 | Oldenburg | F16J 15/3256 277/612 |
| 2002/0051593 | A1 * | 5/2002 | Oka | F16C 19/386 384/448 |
| 2003/0189297 | A1 * | 10/2003 | Chen | F16J 15/3256 277/549 |
| 2005/0035555 | A1 * | 2/2005 | Peterson | F16J 15/3256 277/572 |
| 2006/0012129 | A1 * | 1/2006 | Oldenburg | F16J 15/3256 277/572 |
| 2007/0014499 | A1 | 1/2007 | Vignotto et al. | |
| 2007/0205562 | A1 * | 9/2007 | Chien | F16J 15/3256 277/551 |
| 2008/0272557 | A1 * | 11/2008 | Foti | F16J 15/3264 277/589 |
| 2009/0108539 | A1 * | 4/2009 | Forti | F16J 15/3256 277/553 |
| 2011/0133412 | A1 * | 6/2011 | Mause | F16C 33/7863 277/352 |
| 2011/0233874 | A1 * | 9/2011 | Foti | F16C 41/007 277/562 |
| 2011/0262063 | A1 * | 10/2011 | Dittmar | F16J 15/3276 384/147 |
| 2013/0001885 | A1 * | 1/2013 | Nosenzo | F16C 33/768 277/500 |
| 2013/0322791 | A1 | 12/2013 | Dlugai et al. | |
| 2016/0039246 | A1 * | 2/2016 | Brunetti | F16C 33/7823 277/551 |
| 2016/0229470 | A1 * | 8/2016 | Suzuki | F16C 43/045 |
| 2019/0024800 | A1 * | 1/2019 | Baart | F16C 33/7876 |
| 2020/0124179 | A1 * | 4/2020 | Jimenez | F16J 15/3268 |
| 2020/0166082 | A1 * | 5/2020 | Shah | F16J 15/326 |

FOREIGN PATENT DOCUMENTS

| | | |
|---|---|---|
| CN | 101449073 A | 6/2009 |
| CN | 201902560 U | 7/2011 |
| CN | 105240532 A | 1/2016 |
| CN | 105485319 A | 4/2016 |
| CN | 105556147 A | 5/2016 |
| CN | 207454565 U | 6/2018 |
| DE | 102010054409 A1 | 6/2012 |

* cited by examiner

BEARING SEAL

CROSS-REFERENCE

This application claims priority to German patent application no. 10 2018 220 346.6 filed on Nov. 27, 2018, the contents of which are fully incorporated herein by reference.

TECHNOLOGICAL FIELD

The disclosure is directed to a bearing seal having a metal-plate element that includes an attachment region for attaching to a bearing inner ring and having at least one seal element attached to the first metal-plate element.

BACKGROUND

FIGS. 1 and 2 show known bearing seals that include metal-plate elements 10. These bearing seals attach directly or indirectly to an inner ring 12 of a bearing and include a seal element 14 attached to each metal-plate element. FIG. 3 shows another known seal in which a seal element 14 is pressed against a metal-plate element 10 that is attached to an inner ring 12.

SUMMARY

An aspect of the disclosure is to provide a bearing seal of the above-described type having increased efficiency.

The disclosed bearing seal includes at least one first metal-plate element having an attachment region for attaching the first metal-plate element to a bearing inner ring, and at least one seal element that is attached to the first metal-plate element.

The bearing seal also includes at least one spring element that presses at least one region of the seal element radially outward. This results in an increased efficiency. In particular an increased service life, a low-friction operation, and a compact and cost-effective construction can be achieved.

Further advantages arise from the following description of the drawings. An exemplary embodiment of the disclosure is depicted in the respective drawing. The drawings, the description, and the claims contain numerous features in combination. The person skilled in the art will also advantageously consider the features individually and combine them into further meaningful combinations.

DETAILED DESCRIPTION

Figure 1:
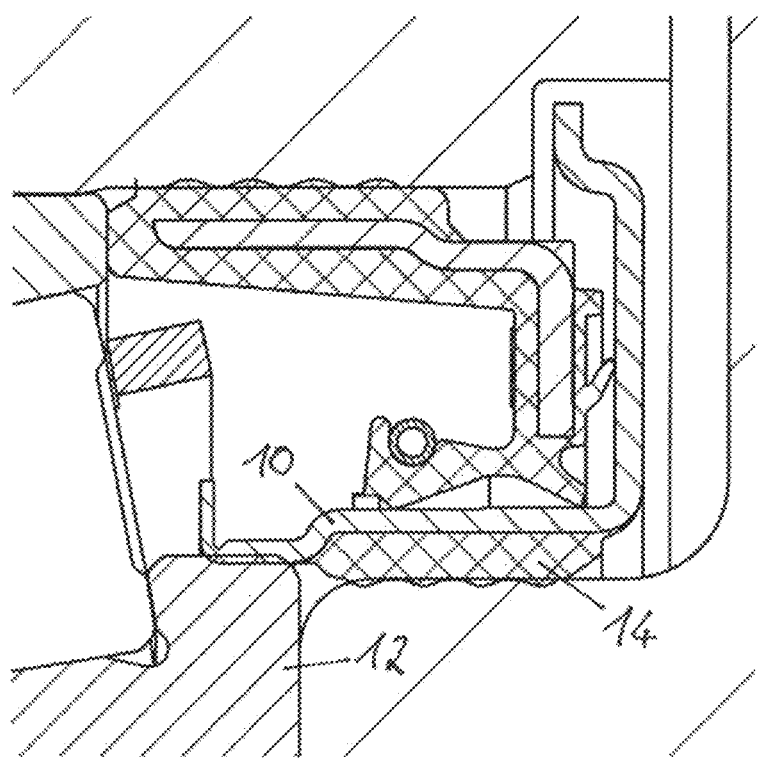
FIG. 1 is a sectional side elevational view of a first conventional bearing assembly.
Figure 2:
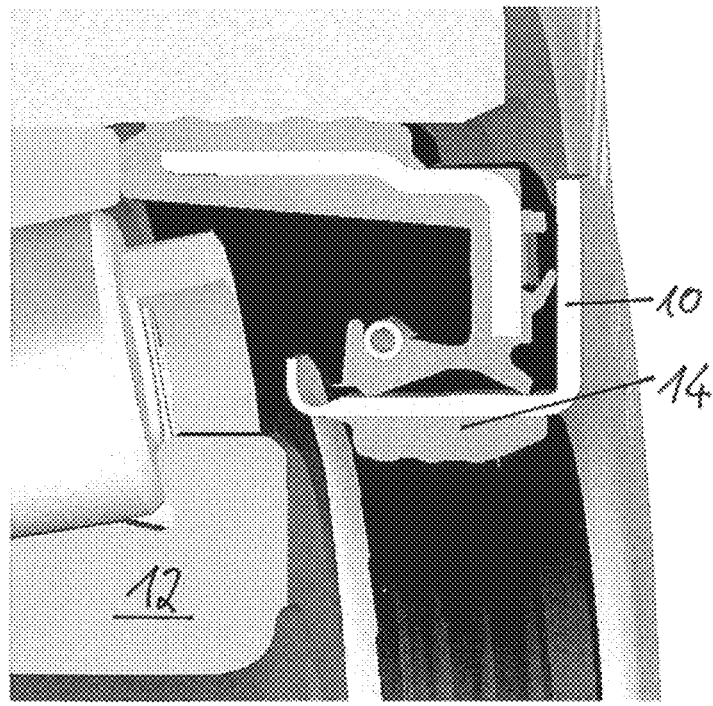
FIG. 2 is a sectional side elevational view of a conventional oil-lubricated bearing assembly.
Figure 3:
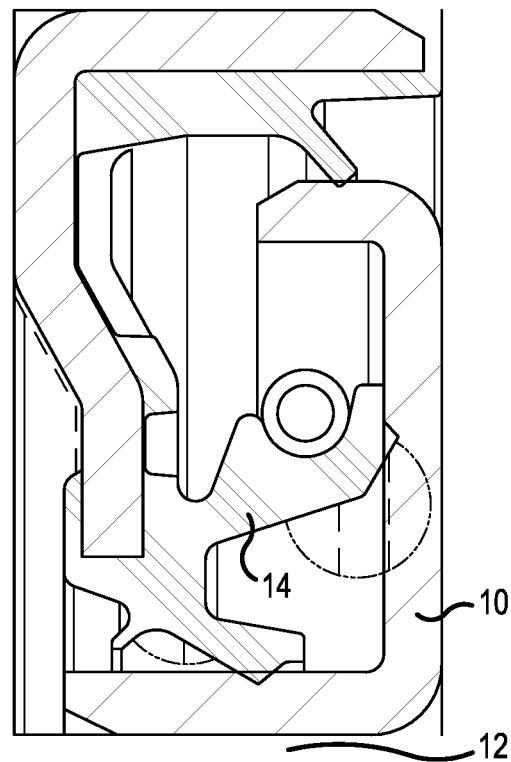
FIG. 3 is a sectional side elevational view of a conventional grease-lubricated bearing assembly.
Figure 4:
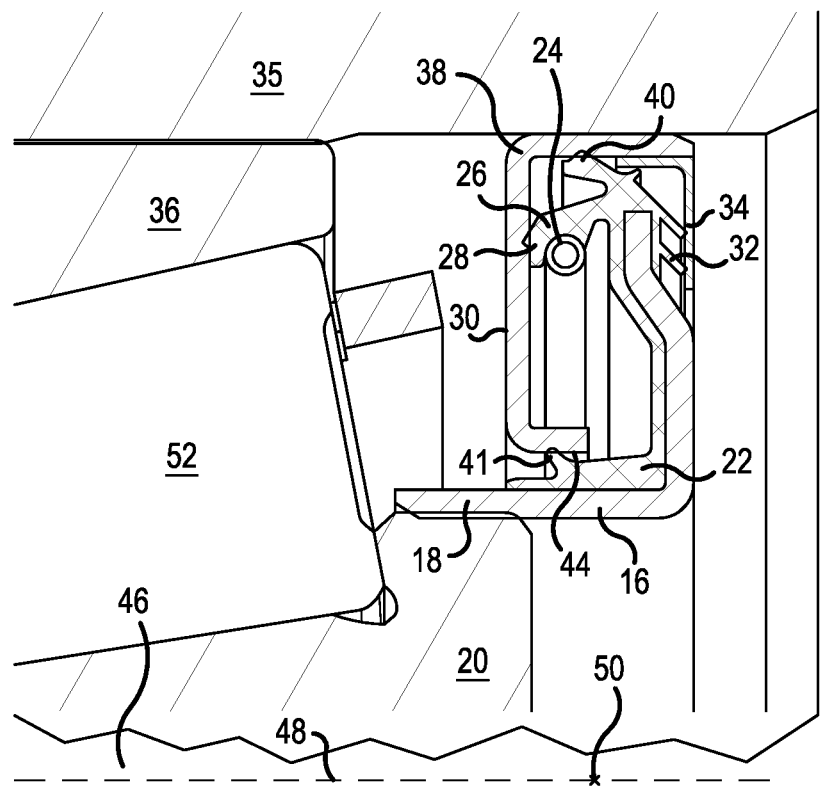
FIG. 4 is a sectional side elevational view of a bearing assembly including a bearing seal according to the present disclosure.

FIG. 4 shows a bearing assembly, specifically a wheel bearing assembly that includes a bearing seal according to the present disclosure. The bearing seal includes a first metal-plate element 16 that has an attachment region 18 by which the metal-plate element 16 is attached to a bearing inner ring 20 of the bearing assembly. Rolling elements 52 of the bearing assembly abut against the bearing inner ring 20 and against an outer ring 36 of the bearing assembly, and together with these form a rolling-element bearing in which, during an operation of the rolling-element bearing, the rings rotate relative to each other about an axis 48. The outer ring is pressed into a hub 35. The bearing seal includes an elastomeric seal element 22 and is attached to the metal-plate element 16. A region 26 of the seal element 22 is pressed radially outward by a spring element 24 of the bearing seal, which spring element 24 is configured as a spiral spring. A seal lip 40 of the seal element, which seal lip 40 extends radially outward, is thereby pressed against a component 38 that is comprised of metal plate and is also pressed into the hub 35. Due to the attachment of the seal element to the metal-plate element 16 and an axial component of the force exerted by the spring element 24, a region 28 of the seal element 22 is pressed axially against a region 30 of the component 38, which region 30 extends in the radially and circumferentially.

Furthermore the seal element comprises a seal lip 32 that extends axially outward and radially inward with respect to the rolling-element bearing. The seal lip 32 contacts a component 34 of the bearing seal that always, even during an operation of the rolling-element bearing, is at rest with respect to the outer ring. The component 34 is pressed into the component 38.

In alternative exemplary embodiments the components 34, 38 are configured one-piece. In other alternative exemplary embodiments an impulse wheel that is used to determine a rotational speed of the outer ring can perform the function of the component 34.

A further seal lip 41 of the seal element contacts a radially inner region 44 of the component 38.

In addition, a center of gravity 50 of the bearing seal is disposed outside a bore 46 of the bearing inner ring. The bearing seal thus protrudes over an axial end surface of the bearing inner ring, so that an axial length of the bearing inner ring can be kept minimal. Furthermore installation space can be saved, and in addition a standard design can be used for the bearing inner ring, which is particularly cost-effective. Due to the good connecting of the bearing seal to the bearing inner ring, the bearing seal offers high running accuracy and a very good seal effect.

In alternative embodiments the metal-plate element is flanged at its axial end that is turned toward the rolling elements, so that a stiffening and strengthening is achieved and thus a better retention on the bearing inner ring is achieved.

The component 34 improves sealing against water and dirt from outside. It is also to be mentioned that, in addition to the seal lip 32, a further seal lip of the seal element abuts against the component 34. The component 34 can also be replaced by a metal plate attached to the hub. If the component 38 and the component 34 are configured one-piece, a flanging is carried out at the end of the installation of the bearing seal in order to form a region against which the seal lip 32 abuts.

Oil or grease can be used as lubricant for the rolling-element bearing. In particular with the use of oil a secure and durable sealing is effected by the bearing seal according to the disclosure.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing seals.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Metal-plate element
12 Inner ring
14 Seal element
16 Metal-plate element
18 Attachment region
20 Bearing inner ring
22 Seal element
24 Spring element
26 Region
28 Region
30 Region
32 Seal lip
34 Component
35 Hub
36 Outer ring
38 Component
40 Seal lip
41 Seal lip
44 Inner region
46 Bore
48 Axis
50 Center of gravity
52 Rolling element

What is claimed is:
1. A wheel bearing assembly including:
a bearing inner ring;
a bearing outer ring; and
a bearing seal, the bearing seal comprising:
a first metal-plate element having a cylindrical portion configured to attach to a bearing inner ring and an annular portion projecting radially from the cylindrical portion in a first direction,
a second metal-plate element having a cylindrical portion configured to attach to a component that is at rest with respect to a bearing outer ring and an annular portion projecting radially from the cylindrical portion of the second metal-plate element in a second direction opposite the first direction,
a seal element attached to the first metal-plate element, the seal element including a first portion extending along the annular portion of the first metal-plate element and a second portion projecting axially from the first portion, the second portion terminating in a first seal lip and including a radially inwardly facing channel between the first seal lip and the first portion, and
a spring in the radially inwardly facing channel configured to press the second portion of the seal element radially toward the cylindrical portion of the second metal-plate element and to press the first seal lip axially against the annular portion of the second metal-plate element,
wherein the first metal-plate element is attached to the bearing inner ring,
wherein the second metal-plate element is attached to the component that is at rest with respect to the bearing outer ring,
wherein the seal element includes a second seal lip pointing at least partially axially outward and contacting a flange of the second metal-plate element, the flange being substantially parallel to the annular portion of the second metal-plate element, and
wherein the flange is an element of a body that is pressed into the cylindrical portion of the second metal-plate element.

2. The bearing assembly according to claim 1, wherein a center of gravity of the bearing seal lies outside a bore of the inner bearing ring.

3. The bearing seal according to claim 1,
wherein the seal element includes a third seal lip located on a side of the annular portion of the first metal-plate element opposite the second seal lip.

4. A wheel bearing assembly comprising:
a hub having an opening at a radially outer end;
a bearing outer ring mounted in the hub;
a bearing inner ring inside the bearing outer ring;
a plurality of rolling elements between the bearing inner ring and the bearing outer ring, and
a bearing seal including:
a first metal-plate element having a cylindrical portion attached to the bearing inner ring and an annular portion projecting radially from the cylindrical portion in a first direction,
a second metal-plate element having a cylindrical portion attached to the hub and an annular portion projecting radially from the cylindrical portion of the second metal-plate element in a second direction opposite the first direction,
a seal element attached to the first metal-plate element, the seal element including a first portion extending along the annular portion of the first metal-plate element and a second portion projecting axially from the first portion, the second portion terminating in a first seal lip and including a radially inwardly facing channel between the first seal lip and the first portion, and
a spring in the radially inwardly facing channel configured to press the second portion of the seal element radially toward the cylindrical portion of the second metal-plate element and to press the first seal lip axially against the annular portion of the second metal-plate element,
wherein a radially inner surface of the cylindrical portion of the first metal-plate element is mounted on a radially outer surface of the bearing inner ring, and wherein the annular portion of the second metal-plate element is located axially between the annular portion of the first metal-plate element and the plurality of rolling elements.

5. The wheel bearing assembly according to claim 4, wherein the sealing element includes a second seal lip in contact with the cylindrical portion of the second metal-plate element.

6. The wheel bearing assembly according to claim 5, wherein the sealing element includes a third seal lip in contact with a flange extending from the cylindrical portion of the second metal-plate element.

7. A wheel bearing assembly comprising:
a hub having an opening at a radially outer end;
a bearing outer ring mounted in the hub;
a bearing inner ring inside the bearing outer ring;
a plurality of rolling elements between the bearing inner ring and the bearing outer ring;
a bearing seal assembly comprising a first metal-plate element having a cylindrical portion, the cylindrical portion of the first metal-plate element including a first section mounted on a radially outer surface of the bearing inner ring for rotation with the bearing inner ring and a second section projecting axially away from the first section and away from the bearing inner ring, and the first metal-plate element having an annular portion projecting from the second section toward the hub;
a seal element attached to the first metal-plate element and including a seal lip projecting from the annular portion of the first metal-plate element toward the bearing outer ring, the seal lip including a radially inwardly facing channel; and
a spring in the radially inwardly facing channel configured to press the second portion of the seal element radially toward the hub.

8. The wheel bearing assembly according to claim 7, wherein at least part of the seal element is located radially outward of the second section.

9. The wheel bearing assembly according to claim 7, including a second metal-plate element having a cylindrical portion mounted to an interior of the hub and an annular portion extending toward the cylindrical portion of the first metal-plate element, wherein the seal element includes at least one seal lip in contact with the second metal-plate element.

10. The wheel bearing assembly according to claim 7, wherein a center of gravity of the bearing seal assembly lies outside a bore of the bearing inner ring.

* * * * *